UNITED STATES PATENT OFFICE.

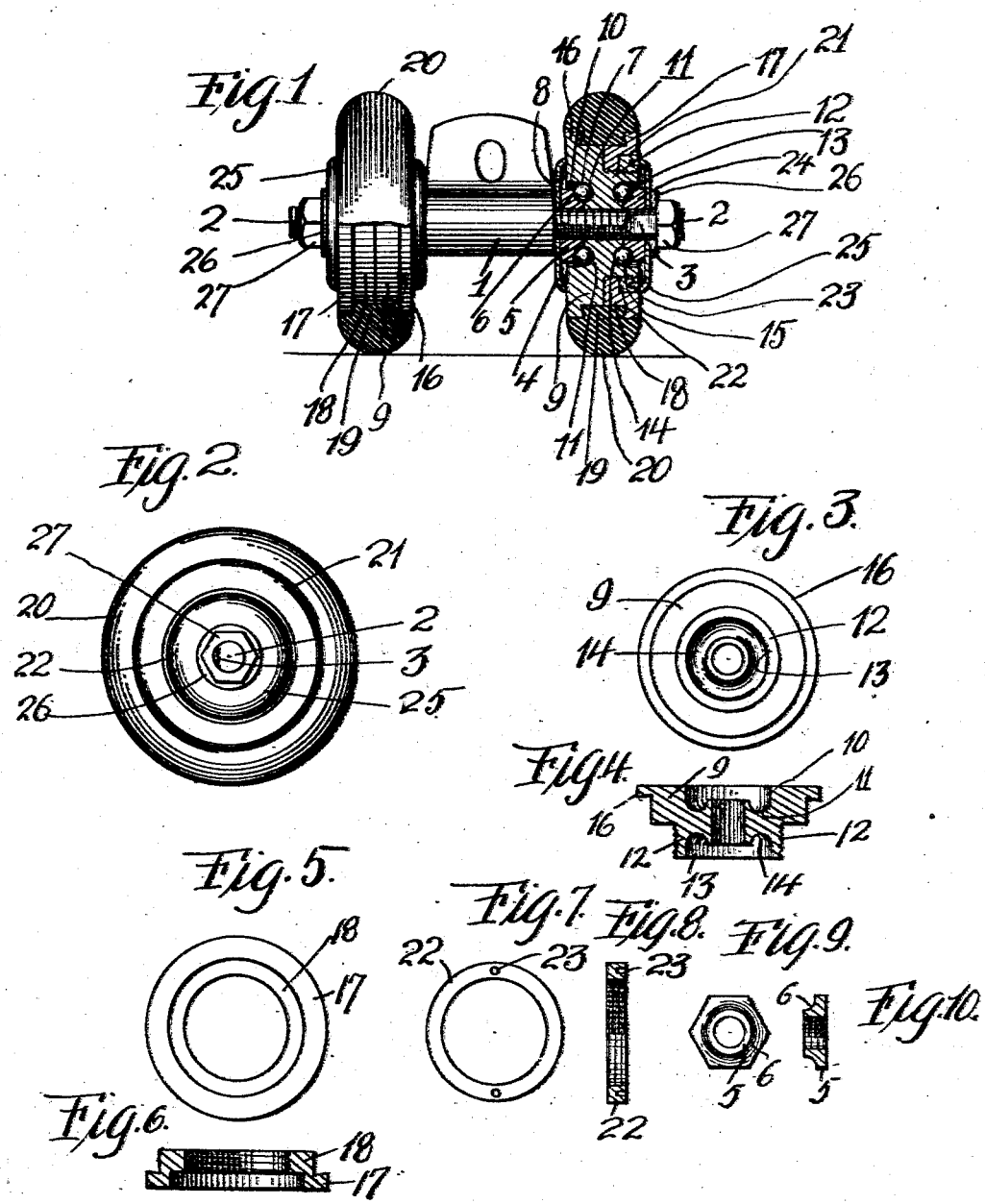

EMORY H. COPENHAVER, OF CALIFORNIA, AND WALTER COLVIN, OF DUNLEVY, PENNSYLVANIA.

WHEEL.

980,607.  Specification of Letters Patent.  Patented Jan. 3, 1911.

Application filed July 8, 1910. Serial No. 571,055.

*To all whom it may concern:*

Be it known that we, (1) EMORY H. COPENHAVER and (2) WALTER COLVIN, citizens of the United States of America, residing at (1) California and (2) Dunlevy, in the county of Washington and State of Pennsylvania, have invented certain new and useful Improvements in Wheels, of which the following is a specification, reference being had therein to the accompanying drawing.

This invention is an improvement in our patent for roller skates, No. 882,999 granted March 24th, 1908.

The present invention relates particularly to wheels for roller skates, and the object of our invention is to provide an anti-frictional wheel consisting of comparatively few parts easily and quickly assembled, inexpensive to manufacture, and when assembled providing a strong and durable wheel.

We attain the above object by providing a wheel consisting of detachable hub sections which permit of the tire and movable parts of the wheel being quickly assembled. The movable parts, particularly the bearing surfaces thereof are hardened and are adapted to withstand the rough usage to which they are subjected by a roller skate in action.

Our invention will be hereinafter considered in detail and then claimed, and reference will now be had to the drawing forming a part of this specification, wherein there is illustrated a preferred embodiment of the invention, but it is to be understood that the structural elements thereof can be varied or changed without departing from the spirit of the appended claims.

In the drawing:—Figure 1 is a front elevation of a roller skate axle provided with our improved wheels, the wheels being shown partly in elevation and partly in vertical section, Fig. 2 is a side elevation of one of the wheels, Fig. 3 is a side elevation of one of the hub sections, Fig. 4 is a cross sectional view of the same, Fig. 5 is a side elevation of another hub section, Fig. 6 is a cross sectional view of the same, Fig. 7 is a front elevation of a locking ring adapted to form part of the wheel, Fig. 8 is a cross sectional view of the same, Fig. 9 is an elevation of an inner nut adapted to form part of the wheel, and Fig. 10 is a vertical sectional view of the same.

The reference numeral 1 denotes a roller skate hanger or bearing and mounted in the hanger or bearing 1 is an axle 2 having the ends thereof exteriorly threaded and provided with longitudinal flat surfaces 3.

Our improved wheels are carried by the threaded ends of the axle, and as the wheels are identical in construction, we deem it only necessary to describe one of said wheels.

Mounted upon the threaded end of the axle 2 is a cup-shaped metallic washer 4, which is held against the end of the hanger or bearing 1 by an inner nut 5 secured upon the axle 2. The nut 5 can be square, hexagon or any desired shape and its outer face is provided with an annular groove or ball race 6 in which are adapted to revolve anti-friction balls 7. The metallic cup-shaped washer is provided with a small port or opening 8 whereby a lubricant can be injected into the washer to lubricate and insure an easy movement of the balls 7.

Loosely mounted upon the axle 2 is a inner wheel section 9, said section being cut away, as at 10 to provide clearance for the nut 5, and the annular vertical wall of the inner section 9 is cut away to provide an annular ball race or groove 11 adapted to receive the anti-friction balls 7. The inner wheel section 9 is provided upon the under side thereof with a hub 12, said hub being exteriorly screw threaded and having the end thereof provided with a recess 13. The vertical annular wall of said recess is provided with an annular groove or ball race 14 for anti-friction balls 15. The periphery of the inner wheel section 9 is cut away to provide an annular rim or flange 16 adapted to coöperate with an annular flange or rim 17, carried by an outer wheel section 18, said section being screwed upon the hub 12. The flanges or rims 17 are adapted to frictionally hold a tire upon the wheel, the tire being constructed of rubber or a similar resilient material and comprising an annular tongue 19 having a semi-cylindrical tread 20, said tread extending over the peripheral edges of the flanges or rims 16 and 17.

The outer face of the outer wheel section 18 is provided with an annular recess 21 adapted to receive a locking ring 22, said ring screwed upon the hub 12 to retain the outer wheel section 18 thereon. The outer side of the locking ring 22 is provided with diametrically disposed sockets 23 adapted to receive a spanner wrench or suitable instrument (not shown) that can be employed for rotating the locking ring 22.

Adapted to screw upon the axle is an outer nut 24 having a groove or ball race similar to the nut 5 for retaining the anti-friction balls 15 within the hub 12. Mounted against the outer face of the nut 24 is a cup-shaped washer 25 similar to the washer 4, and this cup-shaped washer is retained upon the end of the axle 2 by a washer 26 provided with a flat surface adapted to engage the flat surface 3 of the axle and prevent the washer from rotating. This washer is bound against the cup-shaped washer 25 by a nut 27 screwed upon the end of the axle 2.

The cup-shaped washers 4 and 25, inner and outer nuts 5 and 24, washer 26 and nut 27 are adapted to remain stationary relative to the axle, and the anti-friction balls 7 and 15 are adapted to revolubly support the wheel sections 9 and 18 which are held in engagement with the tire by the locking ring 22.

It is an extremely easy matter to renew the tires when they become worn or injured, and by the proper application of a lubricant the wheels of a skate constructed in accordance with our invention can be maintained in running order.

Having now described our invention what we claim as new, is:—

1. In a wheel for roller skates, the combination with an axle having the ends thereof threaded, of an inner wheel section, said section having an exteriorly threaded hub, an outer wheel adapted to screw upon said hub, a resilient tire adapted to be held by said wheel sections, a locking ring adapted to screw upon said hub for retaining said sections together, anti-friction balls arranged in said inner wheel section, nuts screwed upon said axle and having grooved faces adapted to provide recesses for said balls, and cup-shaped washers mounted upon said axle and inclosing said nuts.

2. In a wheel for roller skates, the combination with an axle having threaded ends, of an inner wheel section loosely mounted upon said axle, an exteriorly threaded hub carried by said inner wheel section, an outer wheel adapted to screw upon said hub, flanges carried by the peripheries of said sections, a tire mounted between said flanges, a locking ring adapted to screw upon said hub and hold said sections together, anti-friction balls arranged in said inner wheel section, nuts screwed upon said axle and adapted to retain said anti-friction balls within said section, and cup-shaped washers mounted upon said axle and inclosing said nuts, said washers having openings formed therein adapted to facilitate the lubrication of the said anti-friction balls.

In testimony whereof we affix our signatures in the presence of two witnesses.

EMORY H. COPENHAVER.
WALTER COLVIN.

Witnesses:
J. W. MATHIAS,
ROBERT McEWEN.